April 5, 1938.  A. E. NASH ET AL  2,113,331
METHOD OF AND APPARATUS FOR HEATING PETROLEUM TO ELEVATED TEMPERATURE
Original Filed Jan. 31, 1927   3 Sheets-Sheet 1

INVENTORS
Arthur E. Nash and
BY James S. Alcorn
Cornelius L. Ehret
their ATTORNEY.

April 5, 1938.  A. E. NASH ET AL  2,113,331

METHOD OF AND APPARATUS FOR HEATING PETROLEUM TO ELEVATED TEMPERATURE

Original Filed Jan. 31, 1927  3 Sheets-Sheet 2

Fig. 6.

Patented Apr. 5, 1938

2,113,331

UNITED STATES PATENT OFFICE 2,113,331

METHOD OF AND APPARATUS FOR HEATING PETROLEUM TO ELEVATED TEMPERATURE

Arthur E. Nash, Philadelphia, and James S. Alcorn, Wynnewood, Pa., assignors to Alcorn Combustion Company, Philadelphia, Pa., a corporation of Delaware Application January 31, 1927, Serial No. 164,682
Renewed February 24, 1933

38 Claims. (Cl. 196—47)

Our invention relates to a system for effecting transfer of heat to oil absorption structure, as for example that of oil stills and particularly of petroleum cracking systems or stills, and the like.

In accordance with our invention advantage is taken of the fact that the transfer of heat by radiation and convection occurs at rates which are different functions of the absolute temperature differences between the sources of radiant and convection heat and the heat absorption structure. In our system the heat of combustion is applied both by radiation and convection, in different stages or zones, first mainly or substantially exclusively by radiation and then mainly or substantially exclusively by convection, in such way that even distribution of heat throughout the system is effected, avoiding excess temperatures such as may occur when heat absorption structure is subjected simultaneously to large rates of heat transfer by both convection and radiation.

In accordance with our invention heat generated by combustion and contained in the hot gases or products of combustion is converted in one or a series of stages or zones into radiant heat which is applied to heat absorption in structure in the zone or zones while that structure is in actual or direct contact with the gases or products of combustion, the gas velocity being such or so low that heat transfer by convection to that absorption structure is small, and the absorption structure is preferably outside of the main flow or stream of the gases; and in a later stage or stages heat is transferred substantially exclusively by convection from the gases to another portion of the heat absorption structure while flowing at a velocity effecting suitably high rate of heat transfer. The total heat transferred to the absorption structure in each zone or stage by both radiation and convection is at a rate which is not excessive or sufficiently great as to cause excessive temperature or to cause damage to the absorption structure or to the oil heated.

Further in accordance with our invention there may precede the first mentioned zone or zones another in which heat, abstracted from the hot gases, is applied substantially exclusively as radiant heat to another portion of the heat absorption structure substantially completely isolated from the flowing hot gases of products of combustion.

Our invention resides in the method, system and apparatus of the character hereinafter described and claimed.

For an understanding of our method and for an illustration of some of the various forms our apparatus may take, reference is to be had to the accompanying drawings in which.

Figure 1:
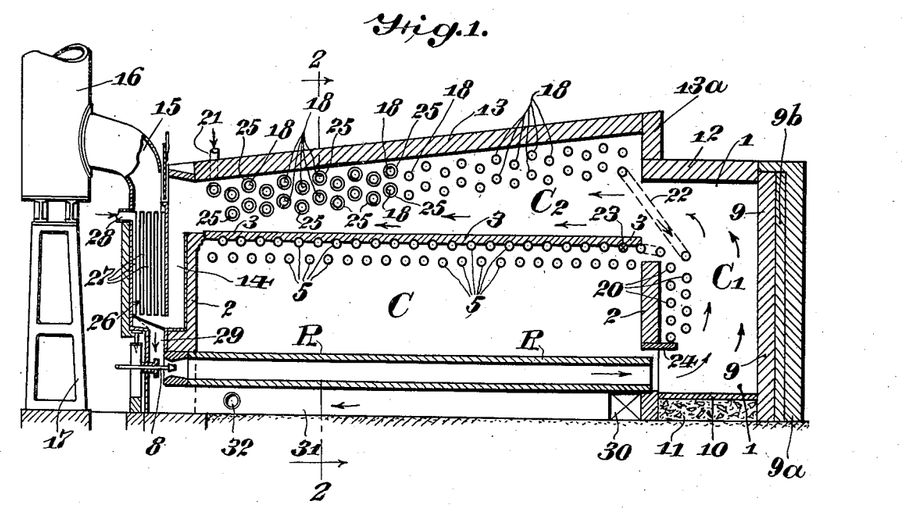
Figure 1 is a vertical sectional view of heat transfer apparatus embodying our invention.
Figure 2:
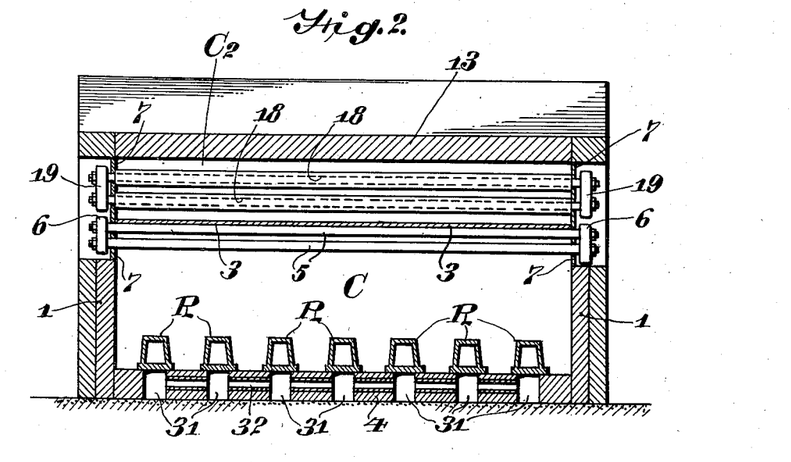
Fig. 2 is a transverse vertical sectional view of the apparatus shown in Fig. 1 taken on line 2—2, Fig. 1.

Referring to Figs. 1 and 2, there are illustrated the furnace side wall structures 1, 1, of any suitable material, but preferably comprising an outer wall of red brick and an inner wall of fire brick. Disposed at each end of said side wall structures are the end walls 2, 2, above or on which is disposed the member or baffle 3, preferably of clay or other refractory material. The aforesaid side wall stuctures 1, 1, end wall 2, 2, and baffle 3, together with the floor or bottom 4, form a chamber C within which is or are disposed one or more oil-conducting heat absorption structures of any suitable character. By preference, such heat absorption structures take the form of tubes 5, of iron, steel or other suitable material, extending in any suitable direction, as, for example, horizontally, as indicated, or inclined or vertical when suitable or desirable. All the tubes 5 may be connected in series with each other, as by the couplings or headers 6. Or the tubes 5 may be disposed in serially arranged groups, each group comprising two or more tubes in parallel with each other.

The tubes 5 may be supported either directly by the side wall structures 1, 1, or, and preferably, by the plates 7, 7, of iron, steel or the like, supported by the side walls 1, 1.

Disposed within the chamber C is or are one or more sources R of radiant heat, the relative positions of the several sources of radiant heat and the tubes 5 within the chamber C being anything suitable or desirable. In the example illustrated, the sources R are disposed on the floor 4 for effecting upward radiation to the tubes 5.

The sources R of radiant heat may be of any suitable type and of any suitable material which may be maintained at incandescence or at temperatures ranging upwardly to 3000 degrees F., or higher.

Said sources R may comprise metallic wall structure, and hence may be of the character illustrated in our application Serial No. 151,307 now U. S. Patent 1,870,640, filed Nov. 29, 1926. However, in the example illustrated, each source R is generally of the character disclosed in our application Serial No. 684,456 now U. S. Patent 1,694,393, filed January 4, 1924, and more particularly of the character disclosed in our U. S. Patent No. 1,591,431, granted July 6, 1926, wherein there is described, as an example of a mode of practicing the invention, combustion chamber wall structure formed in sections by utilizing therefor plates, slabs or tile of silicon carbide, or other highly refractory material, generally in combination with a binder, and having high heat conductivity.

Within each of the chambers R may be effected combustion of any suitable fuel, solid, liquid, or gaseous. In the example illustrated, each chamber R has associated therewith a burner 8 to which gas or oil is supplied, the combustion progressing as the fuel, air and gases pass through the chamber R. Part of the heat of combustion is utilized to raise the walls of the chambers to suitably high temperature to effect suitable rate of radiation of heat to the tubes 5 within the chamber C, from which the hot gases of combustion are more or less completely excluded, or in which hot gases do not wash the tubes 5. The effect is the application to tubes 5 in chamber C of heat which is substantially exclusively radiant and constituting a component of the heat generated.

The hot gases or products of combustion pass from the combustion chambers R into the chamber C1, the side walls of which, in the example shown, are formed by the sections of wall structures 1, 1 extending beyond the end wall 2 of chamber C. The end wall 9 of the chamber C1 may be of character suitable or desirable for the purpose. Preferably end wall 9 comprises an outer section 9a of red brick, the inner section or wall 9 proper of fire brick exposed to the direct contact of the stream of hot gases, and an intervening section or layer 9b of suitable refractory heat insulating material. Forming the floor or bottom of the chamber C1 is the refractory lining 10, of fire brick or the like, preferably disposed upon a suitable filling 11, as broken bricks, stones or the like. Spaced a suitable distance above the baffle 3 is the roof 12 of the chamber C1 likewise constructed of suitable refractory material, as fire brick.

Forming a chamber C2 with the baffle 3 and the side wall structures 1, 1 together with the thereon-supported plates 7, 7, is the inclined or sloping roof 13 of refractory material, as fire brick, or equivalent.

The gaseous products of combustion pass from the chambers R into chamber C1, thence through the chamber C2 generally as indicated by the arrows, Fig. 1, thence through a passage 14 to the flue 15, from which they are passed to one or more stacks 16, each of which may be mounted upon a supporting structure 17.

Disposed within the chamber C2 is a suitable heat absorption structure, herein illustrated as the tubes 18 supported by the side wall structures 1, 1, or the plates 7, 7, preferably extending, as shown, transversely to the path of the hot gases in chamber or zone C2, and suitably connected in series with each other, as by the couplings or headers 19; or the tubes 18 may be disposed in serially arranged groups, each group comprising two or more tubes in parallel with each other. The absorption structure 18, and particularly the right-hand portion thereof, is preferably located, as indicated, out of the direct path of the gases through the chamber C2, as effected by the offset 13a between the roof 13 and the top or roof 12 of the chamber C1.

As regards some aspects of our invention, it is desirable that within the chamber C1 there be disposed a third heat absorption structure, herein shown as a group of tubes 20 also supported on wall structures 1, 1 or plates 7, 7, and connected in series with each other by couplings or headers, not shown; or, as with the tubes 5 and 18, the tubes 20 may be disposed in serially arranged groups, each group comprising two or more tubes in parallel with each other.

The oil to be heated is passed in succession, in any desired order or sequence, through the heat-absorption structures comprising, respectively, the tubes 18, 20 and 5. The oil may be passed first through a part of the tubes 18, then through a part of the tubes 20 or 5, and then through the remainder of the tubes 18, 20 and 5. In the example illustrated, and particularly in those cases where the temperature of the oil is to be raised as it progresses through the heating zones, it is desirable that it be passed through the tubes 18 and 20 prior to passage thereof through the tubes 5. For example, the oil may be caused to enter the tubes 18 at 21, and after passage therethrough may be conducted by conduit 22 to the tubes 20, through which it flows, the oil thereafter passing through the tubes 5 and finally emerging at 23.

The combustion of fuel may be complete or substantially complete within the combustion chambers R, or some of the fuel and air may reach the chamber C1 and there effect the final stage or stages of combustion. In any event, it usually occurs that the interior wall structure of chamber C1 becomes incandescent under the influence of the hot gases emerging from the chambers R. Particularly is this true of the interior face of the wall 9. In other words, the interior wall structure of chamber C1 and the interior face of wall 9 become sources of radiant heat.

In those cases where a group of tubes 20 is disposed within the chamber C1, it is desirable that a baffle or plate 24, of silicon carbide or equivalent, be disposed between said tubes and the discharge ends of the chambers R, whereby the hot gases, to substantial or large extent, are prevented from contacting with the tubes 20. The resultant deflection of the hot gases toward or into contact with the interior surface of wall 9 more readily brings the same to high temperature, with consequent high rate of radiation therefrom. It results, therefore, dependent upon the extent to which the hot gases are deflected, that to the tubes 20 there is little transfer of heat by convection. However, to these same tubes 20, heat is transferred at high rate by radiation from the walls of the chamber C1 and even from the baffle 24.

As hereinbefore stated, the hot gases pass from the chamber C1 into the chamber C2, and, due to the inclined or sloping arrangement of the tubes 18 beneath the sloping roof 13, a large number of those tubes nearest the entrance to said chamber C2 are removed from the path of the gases, whereby the heat transferred by convection to the tubes last named is largely or to great extent diminished. To these same tubes, however, heat is transferred by radiation, and, in the example illustrated, this radiant heat comes particularly from the upper portion of the radiating surface of wall 9, along a path through the opening between the upper end of wall 2 and roof 12.

Accordingly to heat absorption structures in a plurality of regions or zones, namely, the tubes 20 in chamber C1 and those of the tubes 18 at the right of chamber C2, heat is transferred largely or mainly by radiation, notwithstanding the fact that the gases flow through the chambers in which the tubes or heat absorbing structures are disposed.

Customarily hot gases in or emerging from a combustion chamber pass around a bank of tubes and contact directly therewith, with resultant transfer thereto of heat by convection. At the same time, the hot gases bring at least a part of the wall structure of the tube-containing chamber to such high temperature that the aforesaid bank of tubes or some of them receive substantial amounts of heat by radiation. Under such conditions, excessive heat absorption and consequent temperature rise frequently occur, particularly as regards those tubes most directly exposed to radiant heat, with consequent deterioration of the tubes and damage to the material passing therethrough.

With our invention, however, the furnace design may be such that there is transfer of heat largely or mainly by radiation and relatively little by convection to those tubes which heretofore have been subjected to the combined action of radiant and convection heat. It results, therefore, that the rate of absorption of heat in our system is of a preferable order of magnitude.

It will be observed that a large number of the tubes 18 at the left of chamber C2 are to a substantial degree removed from the wall structure of chamber C1 comprising the sources of radiant heat; particularly, said tubes receive heat from but a limited area of the wall 9 of said chamber C1. It follows, therefore, that the aforesaid tubes 18 at the left of chamber C2 receive radiant heat only to a limited extent.

A further feature of our invention resides in the provision of a path through the chamber C2 converging in the direction of flow of the gaseous products of combustion. By this arrangement, as illustrated in Fig. 1, the tubes 18 at the left of chamber C2 are disposed more or less directly in the path of the gases, and as a result, to a substantial extent, heat is transferred to said tubes by convection.

As the gaseous products of combustion pass from right toward the left in chamber C2, their temperature progressively decreases with consequent decrease of their volume. However, since the rate at which heat is convectively transferred to a bank of tubes by hot gases contacting therewith is dependent upon the gas velocity, compensation for this deficiency in temperature may be effected by controlling the velocity of the gases, which may be accomplished, as illustrated in Fig. 1, by progressively decreasing the cross-sectional area of the passage traversed by the gases, whereby a velocity for efficient heat transfer is obtained.

Under some circumstances, in order further to increase the rate at which heat is transferred by convection to the tubes 18 at the left of chamber C2, some of them may be encased in iron members or gill rings 25, for increasing the area of the surfaces contacted by the gaseous products of combustion, and for increasing the gas velocity.

In the arrangement as illustrated by Fig. 1, and in other modifications herein, the tubes, such as 18, in zone or chamber C2, are heated both by convection and radiation with the result that they absorb a total heat which is of very high magnitude, while any individual tube is not excessively heated, and besides by the heat radiated to the tubes 5 in the radiant chamber C large amounts of heat are extracted from the hot gases and absorbed by the tubes, resulting in high efficiency, as exemplified by the fact that the gases passing from the zone C2 to stack or elsewhere are of relatively low temperature.

The hot gases washing the baffle 3 impart heat thereto which is then radiated to the tubes 18, the radiation from the baffle 3 progressively diminishing from right toward the left. In addition through the mouth or opening of the zone or chamber C2 at its right there passes radiant heat from the wall structure of the zone or chamber C1 affecting tubes 18 toward the right end of the zone C2 more than at points beyond or at the left end thereof. Of the total heat radiated to the tubes 18 in chamber C2 the greater part is absorbed by or affects the tubes 18 toward the right, and the heating of these tubes by radiation diminishes from right toward the left in this zone. At the same time, because of the decrease in cross sectional area of the gas path, both of the total and of the free path unoccupied by tubes, from right to left of zone C2, the absorption of heat by the tubes 18 due to convection tends to increase from right toward the left, and in any event more or less completely compensates for decrease of gas temperature from right to left. In consequence the radiant and convection heats operate complementarily, the radiant heat decreasing while the convection heat increases from right to left. The result is in effect a control of application of heat to the tubes 18 both by radiation and convection in such way, as aforesaid, that the total heat absorbed is of very high magnitude, without however excessive temperature rise of any individual tube. Where the radiant heat is high the convection heat is low and while their sum is throughout the zone very great, their combined effect upon any individual tube is insufficient to dangerously overheat it or the fluid passing therethrough.

In a system of the character illustrated in Figs. 1 and 2, the arrangement of the several zones, chambers, and heat absorption structures is effectively compact. The hot gases or products of combustion pass for example first toward the right, as through radiant combustion chambers R, thence into the chamber C1, upwardly therein, and reversing their direction and passing thence toward the left in chamber C2. In the chamber C1, where the course of the gases is, generally speaking, changed, or specifically, reversed, there is effected a conversion of convection into radiant heat, in consequence cooling the gases and utilizing the radiant heat in two zones, in both chambers C1 and C2, to transfer heat to the absorption structures 20, and 18, respectively.

In a specific aspect, the system of Figs. 1 and 2 is characterized by obtaining at least two components of radiant heat, one of them applied to the heat absorption structure 5, substantially exclusive of convection heat, and the other or others applied to the heat absorption structures 20 and 18 but in the presence of the gases or products of combustion, but nevertheless reducing the amount of heat applied to these last named structures by convection.

The cross section of the gas passage in chamber C1 is so great or such that, with respect to the volume of gases flowing, their velocity in the chamber C1 is relatively low, and hence there obtain conditions in the chamber C1 adverse to efficient transfer of heat by convection to the absorption structure 20 which however absorbs radiant heat at a suitably high rate from the wall 9 and other radiating walls. Again in the right portion of the chamber C2, Fig. 1, the rate of flow or velocity of the gases is low because of the relatively great cross section of their path, and here again that portion of the heat absorption structure 18 toward the right of the chamber is nevertheless heated at satisfactory rate by radiation from the wall 9 and other radiating walls of the chamber C1, with substantial radiation also from the upper surface of the baffle or dividing wall 3, and especially from the right hand portion thereof. However when the gases reach the left portion of the chamber C2 the cross section of their path has been so reduced that their velocity is increased or at any rate of such magnitude as effectively to transfer heat to the tubes 18 by convection, and in this convection heating zones there may be applied the aforesaid gill rings 25 having the double effect of reducing the cross section of the gas passage, thereby increasing the gas velocity, and of increasing the heat absorbing surface.

The system is, in one aspect, accordingly characterized by conversion of convection into radiant heat in a zone or zones where the gas velocity is slight or low for the purpose of reducing transfer by convection to tubes or structure absorbing that radiant heat while in actual or direct contact with the gases, though preferably located out of or beyond the gas stream proper.

Viewing the system of Figs. 1 and 2 from another aspect, it is characterized by the fact that the heat of combustion is applied both by radiation and convection, but in such way that radiant heat is applied to those heat absorption structures, or those portions of a composite heat absorption structure, to which heat is more advantageously transferred by radiation than by convection, because of the fact that the rate of transfer of heat by radiation is a function of the fourth power of the difference between the absolute temperatures of the radiator and absorber.

Besides abstracting heat from the hot gases or products of combustion and applying it in radiant form, there is the additional or supplemental transfer of heat mainly or substantially exclusively by convection from the gases under circumstances or conditions where application of heat in radiant form is or would be less or no more advantageous than by convection. The gases, previously cooled by abstraction of heat applied by radiation, transfer heat by convection in a later stage represented, for example, by the left end of structure 18. By so applying heat both by radiation and convection in the way and for the purposes indicated, there arise substantial and distinct practical advantages in that there is obtained a material increase in the rate of heat transfer per square foot of tube or heat absorption surface; the cost of construction, particularly of tubular heat absorption structure, is materially reduced; tube trouble or deterioration is almost completely avoided; high combustion efficiency or fuel economy is obtained, because the waste gases leaving the system are at relatively low temperatures; and in the case of heating oil, as for cracking petroleum or product or component thereof, the deposit or production of carbon is reduced and the product improved, because of the even distribution of heat transfer at a rate or rates avoiding excess temperatures.

In accordance with the system above and hereinafter described heat is applied very largely or mainly in radiant form and a less proportion than usual is applied by convection, with the result that from one end of the system to the other heat is nowhere absorbed or applied at high rate, the application of heat from stage to stage throughout the system is more evenly or uniformly graduated, and in any zone or stage the rate of transfer of heat to the absorption struction therein by both convection and radiation is of magnitude preventing excessive temperatures and undesired effects.

A further feature of our invention involves an arrangement for passing the gaseous products of combustion into heat-exchanging relation with respect to the air passing to the combustion chambers R. To this end, the gaseous products of combustion may be passed from passage 14 to one or more preheaters 26 of any suitable character. In the example illustrated, each preheater 26 comprises a plurality of spaced, hollow, plate-like structures 27 between which the gases pass upwardly, as viewed in Fig. 1, and thence to flue 15. It shall be understood that the passage between the plates of each structure 27 is connected to the passage between the plates of neighboring structures 27, whereby there is afforded a circuitous path for the air which may be passed by a blower, not shown, to the preheater at 28, and, after absorbing heat by contact with the plate-like surfaces of the structure 27, passes by way of passage 29 to the entrances to the combustion chambers R.

Under some circumstances, it may be desirable to pass the heated air by a conduit, not shown, from the preheaters 26 to a header 30, Fig. 1, transversely disposed beneath the combustion chambers R. Communicating with header 30 are the passages 31, longitudinally disposed beneath the respective chambers R and along which the heated air is passed to the aforesaid entrances to the chambers R. If desired, in order to equalize the air pressure, the passages 31 may be connected by one or more equalizing passages 32.

Figure 3:
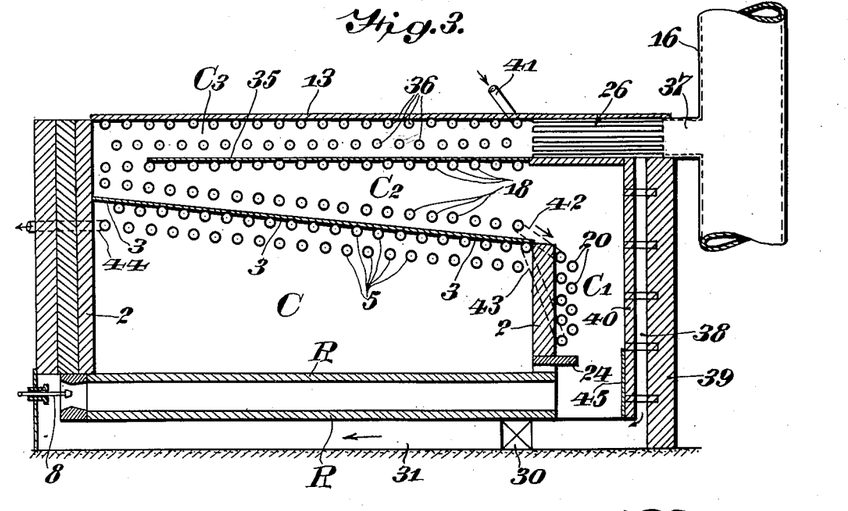
Figs. 3, 4, and 5 are, respectively, vertical sectional views of other forms of heat transfer apparatus.

Referring to Fig. 3, there is illustrated a form of our invention wherein the baffle or plate 3 forming the roof or top of chamber C is inclined and forms with a wall or baffle 35 a chamber C2 receiving the gaseous products of combustion from chamber C1. Due to the inclined position of baffle 3, the cross-sectional area of chamber C2 progressively decreases in the direction of flow of the hot gases. Obviously, if desired, the wall 35 may be inclined toward baffle 3 to further restrict or modify the cross-sectional area of chamber C2, particularly that portion at the left, Fig. 3.

The wall or baffle 35 forms with the furnace roof a chamber C3 preferably of substantially the same cross-sectional area throughout its length. Disposed within the chamber C3 are the tubes 36 suitably supported, as by the furnace side walls, and connected in series or other suitable arrangement by couplings or headers, not shown.

As illustrated in Fig. 3, the gaseous products of combustion pass from the right toward the left through chamber C2 and thence in reverse direction, that is, from left toward the right, through chamber C3 from which they may pass through one or more preheaters or heat exchanging structures 26 and thence by way of a passage 37 to the stack 16.

Simultaneously, air is admitted by way of a passage, not shown, to the preheater 26 from which by way of a passage 38 the preheated air may be conducted to the header 30 from which distribution to the inlet sides of the various combustion chambers R is effected by way of passages.

The passage 38 may be formed in any suitable manner, preferably, however, as indicated, by providing a space between the wall structures, 39 and 40, respectively of red brick and fire brick or other suitable refractory materials.

In the example illustrated, the oil to be heated enters the tubes 36 at 41 and after traversing them and the tubes 18 passes by way of a conduit 42 to the tubes 20. After passing therethrough, the oil travels by way of conduit 43 to the tubes 5, from which it emerges by way of conduit 44. It shall be understood, however, that the various groups or banks of tubes may be connected as found desirable to conduct the oil therethrough in any desired order or sequence.

As with the form of our invention illustrated in Figs. 1 and 2, the wall 40, which may be provided with the heat-resisting metal facing 45, is heated to a high degree by the hot gases emerging from the combustion chambers R; as a result, to the tubes 20, when utilized, and to those of the tubes 18 at the right of chamber C2 large or substantial amounts of heat are applied by radiation. At the same time, the furnace design is such that the aforesaid tubes are substantially without the path normally traversed by the gases and, hence, the amount of heat transferred thereto by convection is materially smaller than would obtain if the tubes were interposed directly in the gas passages; and the transfer of heat by convection is further reduced because of the low gas velocity.

The tubes at the left of chamber C2 are more or less directly in the passage pursued by the gaseous products of combustion and since to these tubes the heat application is largely by convection, the cross-sectional area of the gas passage in this region is such that the gas velocity is of a magnitude sufficient to develop the desired rapidity of heat transfer.

In the chamber C3 the tubes 36 are heated substantially exclusively by convection and hence the velocity of the gases should be kept quite high. Ordinarily, the cross-sectional area of the chamber C3 should be no greater, and may be substantially less, than that at the left of the chamber C2, at whose right heat transfer is mainly by radiation, and the transfer at this region by convection is low, as explained in connection with Fig. 1.

Figures 4, 5:
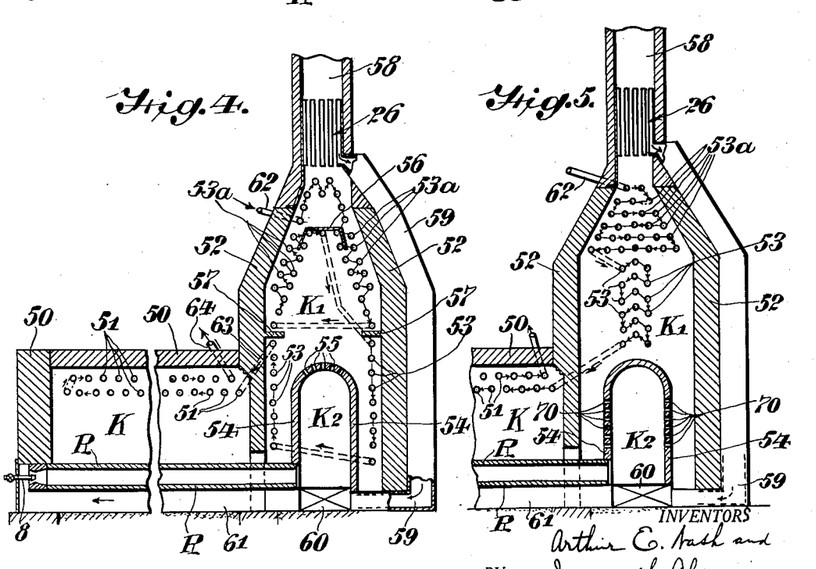

Referring to Fig. 4, K is a heating chamber whose walls 50 may be of fire brick or equivalent refractory material. Disposed within the chamber K is a suitable heat absorption structure herein shown as the horizontally disposed tubes 51 preferably supported by the chamber side walls.

Disposed within the chamber K is or are one or more sources of radiant heat R which may be of the character hereinbefore described.

Adjacent the chamber K is the second chamber K1 whose walls 52 are likewise preferably formed of fire brick or the like. Disposed within the chamber K1 and preferably supported by its side walls is a heat absorption structure comprising, in the example shown, the horizontally disposed tubes 53.

Within the chamber K1 is a secondary chamber K2 whose wall structure 54 is of any suitable material resistant to the destructive effects of high temperature and having high heat conductivity. In the example illustrated, the wall structure 54 preferably comprises plates, slabs or tiles of silicon carbide or equivalent.

Within the chamber or chambers R may be effected combustion of any suitable material, solid or fluid. Ordinarily, gas or oil supplied to the burner or burners 8 is burned within the chamber or chambers R and part of the resultant heat is utilized to raise the wall structure of the combustion chamber or chambers R to suitably high temperature to effect suitable rate of radiation of heat to the tubes 51 within the chamber K from which the hot gases of combustion are more or less completely excluded.

The hot gases or products of combustion pass from the chamber or chambers R into the chamber K2 which is directly in communication therewith, after which they pass upwardly and escape to the chamber K1 through the passages 55 in the preferably arched roof or top of chamber K2.

The combustion of fuel may be complete or substantially complete within the chamber or chambers R, or some of the fuel and air may reach the chamber K2 and there effect the final stage or stages of combustion. In either event, the wall structure 54 of chamber K2 attains high temperature, usually of a magnitude producing incandescence, and so becomes a source of radiant heat.

It will be observed that for some distance above the chamber K2 the tubes 53 are positioned in proximity to the chamber wall structure 52 thereby providing a tube-free passage of some length within the chamber K1 through which a great volume of the hot gases pass.

Accordingly, to those tubes thus removed from contact with the hot gases the transfer of heat by convection is substantially and materially smaller than would exist if such tubes were directly in the gas passage. However, the tubes last mentioned are directly in the path of heat radiated by the wall structure 54 of chamber K2, and it results, therefore, that said tubes and the therein-contained material are heated mainly by radiation.

A substantial distance above the chamber K2, the transfer of heat by radiation from the wall structure 54 of said chamber is greatly decreased particularly as regards those tubes nearest the wall structure 52. Therefore, in this region the furnace design should be such that the tubes 53a are to greater or less extent interposed in the path of the gases. Moreover, as illustrated under some circumstances, it may be desirable to maintain the gas velocity at a desired value by causing the upper wall structure 52 of chamber K1 to converge in the direction of travel of the gases to thereby increase the rate of heat transfer by convection to the upper tubes 53a.

At times, it may be desirable to interpose a baffle in the upper part of chamber K1, the baffle 56 being disposed in the normal path for the gases and serving to deflect them toward and into contact with the tubes adjacent the wall structure 52. It may also be desirable to provide baffles or members 57 of fire brick or other suitable refractory material extending laterally from the wall structure 52 of chamber K1 by which the hot gases in the region adjacent the chamber K2 are deflected or diverted from those tubes 53 receiving large amounts of heat by radiation from the wall structure 54 of chamber K2.

As illustrated in Fig. 4, the lower vertical wall structure 54 of chamber K2 is spaced from the wall structure 52 of chamber K1 and in the region thus provided are located the lowermost tubes 53, which, obviously, receive heat largely by radiation from the wall structure 54.

As the hot gases pass upwardly through the chamber K1 they eventually reach and pass through the preheater or heat exchange structure 26 and escape to the atmosphere by way of the stack 58. Simultaneously, air may be forced by a blower through a passage, not shown, to the preheater 26 and after traversing the same passes by way of a conduit 59 to a header 60 from which the preheated air may be transferred by ducts or passages 61 to the inlet ends of the various combustion chambers R, all as particularly described with reference to Figs. 1 and 2.

Obviously, the tubes 51, 53 and 53a in the respective stages or zones may be connected in any desired order or sequence in series or series-parallel arrangement. As illustrated, the oil enters at 62, then passes through all the tubes 53a and 53 as indicated, then through a connection 63 to a tube 51, then through all of the latter in series and finally emerges by way of conduit 64.

In Fig. 5, the side walls of the chamber K2 are provided with the openings or passages 70 through which the hot gases pass. Thereafter, they flow upwardly without too great extent contacting with the lowermost bank of the tubes 53, which, in the examples shown, are disposed above the non-perforated roof of the chamber K2. The aforesaid bank of tubes, then, is largely heated by radiant heat transmitted from the upper wall structure of chamber K2 and from the walls 52 of chamber K1.

The upper bank of tubes 53a, namely, those shown as lying within the converging part of chamber K1, and particularly the upper tiers thereof, do not have substantial amounts of radiant heat applied thereto and, hence, they are disposed directly in the path traversed by the gaseous products of combustion which, accordingly, contact therewith and convectively heat the same.

Under some circumstance it may be desirable to encircle some of the tubes 53a of both Figs. 4 and 5 particularly, those nearest the wall structure 52 in the upper part of chamber K1 with gill rings for increasing the surface exposed to contact with the gases, as described in connection with Figs. 1 and 2.

Figure 6:
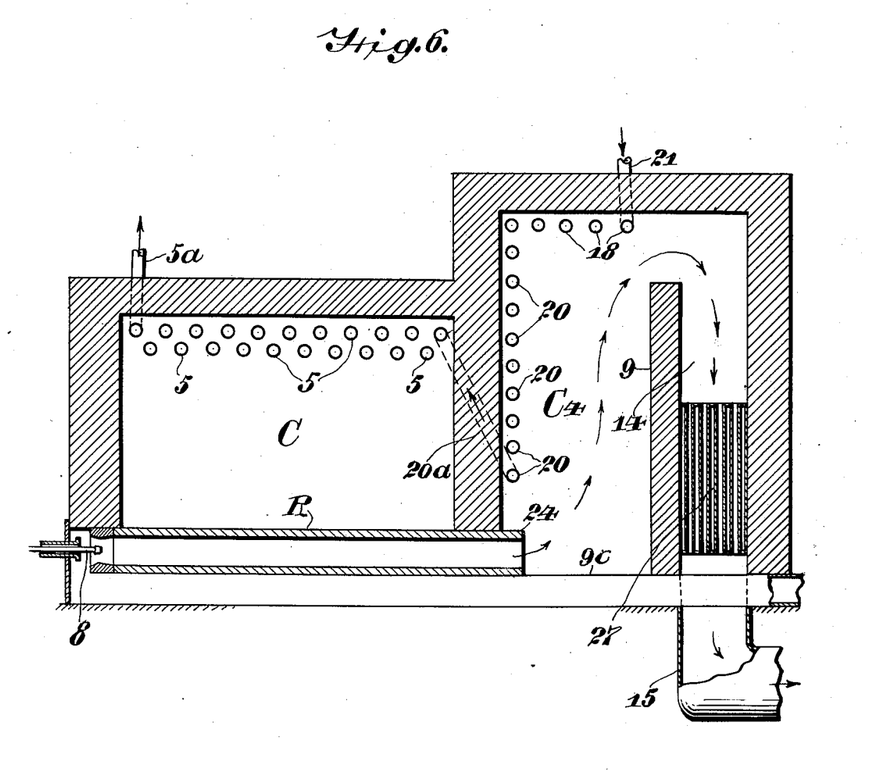
Fig. 6 is a vertical sectional view of a modification.

In Fig. 6 there are shown a desirable structure and arrangement for effecting transfer of great amount of heat to heat absorption structure comprising a small number of tubes having or affording small heat absorption surface.

The tubes 5 in chamber C receive heat substantially exclusively by radiation from the radiation combustion chamber R from which the hot gases or products of combustion are delivered into the chamber C4 in which their path is of such great cross section that their velocity is slight or so low, especially in their contact with the tubes 20 and 18, that transfer of heat thereto by convection is minimized. The inner end of the chamber R projecting into chamber C4 may constitute in effect a baffle or shield 24 directing the gases so that the tubes 20 are outside of the main stream of gases as explained in connection with Fig. 1. However, the gases impinge upon or heat the walls, including wall 9, which, with the bottom 9c, which latter may also be of refractory material, become sources of radiant heat transferred to the tubes 20 and 18 at such rates that they do not attain excessive or high temperatures because of the small amount of heat transferred thereto simultaneously by convection. The gases flow, as indicated by the arrows, over the upper end of the wall 9 and thence downwardly at substantially higher velocity through the passage 14 in contact with the heat transfer structure 27, for heating the air for the combustion chambers, or operating as tube economizers, and thence to the flue 15.

Oil or other material to be heated may enter at 21, pass in succession through the tubes 18 and then through the tubes 20 and thence by connection 20a to the tubes 5 from which it is discharged through the pipe 5a.

Here again the absorption structures 18 and 20 are heated mainly by radiant heat though in actual or direct contact with the hot gases but under conditions minimizing heat transfer by convection, and again allowing the beneficial result that the total heat transferred by both convection and radiation is not excessive, preventing deterioration of the tubes themselves or undesired influence upon the material within then undergoing heat treatment.

In the system of Fig. 6 none of the heat absorption structures has transferred thereto substantial quantities of heat by convection. In this system so much of the heat of combustion as is absorbed by the several absorption structures is transferred thereto mainly or substantially entirely by radiation. Tubes 20 and 18 are so located as to be but slightly, if at all, washed by the hot gases and are therefore but slightly heated by convection, though they are effectively heated by radiation from walls 9 etc.

In our arrangement herein described the tubes in the several zones or chambers, except those having rings 25 applied thereto in Fig. 1, are bare and are directly subjected to radiant and convection heat in the relations hereinbefore described, without embedding any of the tubes or surrounding them with refractory or other material of low heat conductivity to retard or lessen the rate of absorption of heat by the tubes.

Petroleum, or a component or a product thereof, may be heated in accordance with our method or by our structure for effecting any desired result. For example, with apparatus constructed as illustrated in Figs. 1 and 2, the oil may be first passed through the tubes 18, then through the tubes 20, and thereafter through the tubes 5. While in the tubes 18 at the left of chamber C2, the oil, to a more or less variable extent, is preheated. Thereafter, while in the remainder of the tubes 18 and in the tubes 20, the oil may be subjected to the same or different temperatures, usually relatively high, as a result of the relatively large amounts of radiant heat transferred thereto by the wall structure of chamber C1; and in tubes 5 the oil is raised to or maintained at suitable temperature by radiant heat. The oil may be subjected to conditions effecting dissociation or cracking in any or all of the tube groups, under any suitable pressure, as super-atmospheric pressure; or may be suitably heated and discharged to a cracking or reaction chamber.

Petroleum may also be suitably treated, distilled or cracked in the structures indicated in Figs. 3, 4, 5 and 6, wherein it is characteristic, as with the structures indicated in Figs. 1 and 2, that tubes and the therein-contained material are heated largely by radiation, which heretofore have been heated almost entirely by convection.

Our system is of special importance in the petroleum industry wherein it may be utilized for heating petroleum, or product or component thereof, to suitable temperature, to effect cracking or dissociation, which may be more or less completely effected within the heat absorption structure, or which may be partially or substantially entirely effected in a reaction chamber to which the heated oil may be discharged from our system.

Where petroleum or a product thereof is subjected to high temperatures our system is particularly of importance and value in that deterioration or burn-out of tubes is minimized because we prevent excessive heat transfer to any component or portion of the heat absorption structure by the combined effects of radiation and convection. So preventing excessive transfer of heat has the advantage also of preventing local overheating of the petroleum under treatment, and on the whole reduces carbon, especially in cracking processes, and in general improves the product.

Our present system involves features of structure and method disclosed and claimed in our Letters Patent # 1,591,431, but involves departure therefrom particularly in the matter of conversion of a portion of the available heat to radiant form in which it is transferred to absorption structure disposed in or along the path of the hot gases or products of combustion in such relation or under such conditions that the heat transferred to that absorption structure by convection is low or minimized, except where and as hereinbefore described.

What we claim is:

1. In an oil heating system in which heat is applied to the oil by different modes of heat transfer in different zones while flowing in succession through banks of oil-conducting heat-absorbing tubes within said zones, the method of heating the oil to elevated discharge temperature which comprises, producing in unobstructed radiant view of the tubes of a bank within one of said zones a current of hot combustion gases having substantial initial velocity therein, utilizing the directional effects upon said gases of their initial velocity and of their tendency to rise within said one zone to direct said current of gases in positive avoidance of, and along a path adjacent and substantially parallel to, said bank of tubes within said one zone, transferring heat of said gases substantially solely by radiation to said tubes within said one zone and reducing the temperature of said gases, and transferring heat, at least in part by convection, from said gases of reduced temperature to one of said banks of tubes within another of said zones.

2. In an oil heating system in which heat is applied to the oil by different modes of heat transfer in different zones while flowing in succession through oil-conducting heat-absorbing structure within said zones, the method of heating the oil to elevated discharge temperature which comprises, producing in unobstructed radiant view of the oil-conducting structure within one of said zones a current of hot combustion gases having substantial initial velocity therein, utilizing the directional effects upon said gases of their initial velocity and of their tendency to rise within said one zone to direct said current of gases in positive avoidance of, and along a path adjacent and substantially parallel to, said structure within said one zone, transferring heat of said gases substantially solely by radiation to said structure within said one zone, passing said current of gases while in the zone of radiant heat-transfer above said structure within said one zone and into another of said zones, in said other zone transferring heat by radiation and convection from said gases to the oil-conducting heat-absorption structure within said other zone.

3. In an oil heating system in which heat is applied to the oil by different modes of heat-transfer in different zones while flowing in succession through tubular oil-conducting heat-absorbing structure within said zones, the method of heating the oil to elevated discharge temperature which comprises, producing in unobstructed radiant view of the oil-conducting structure within one of said zones a current of hot combustion gases having substantial initial velocity therein, utilizing the resultant of the directional effects upon said gases of their initial velocity and of their tendency to rise within said one zone to procure passage of said current of gases in positive avoidance of, and along a path adjacent and substantially parallel to, said oil-conducting structure within said one zone, transferring heat of said gases substantially solely by radiation to said structure within said one zone to reduce the temperature of said gases, and transferring heat by radiation and convection from said gases of reduced temperature to the oil-conducting structure within another of said zones.

4. In an oil heating system in which heat is applied to the oil by different modes of heat transfer in different zones while flowing through banks of oil-conducting heat-absorbing tubes within said zones, the method of heating the oil to elevated discharge temperature which comprises, producing in unobstructed radiant view of the tubes of one of said banks within one of said zones a current of hot combustion gases of substantial initial velocity, said hot gases having a tendency to rise within said one zone, utilizing the resultant of the directional effects upon said gases of their initial velocity and of their tendency to rise within said one zone to direct said current of gases in positive avoidance of, and along a path adjacent and substantially parallel to, said one bank of tubes, one of said effects acting upon said gases in direction to move them away from said one bank and the other of said effects acting in direction to move said gases along said path, transferring heat of said gases substantially solely by radiation to said tubes within said one zone, and thereafter transferring heat, at least in part by convection, from said current of gases to the bank of tubes within another of said zones.

5. In an oil heating system in which heat is applied to the oil by different modes of heat transfer in different zones while flowing through banks of oil-conducting heat-absorbing tubes within said zones, the method of heating the oil to cracking temperature which comprises, producing in unobstructed radiant view of the tubes of one of said banks within one of said zones a current of hot combustion gases of substantial initial velocity, said hot gases having a tendency to rise within said one zone, utilizing the resultant of the directional effects upon said gases of their initial velocity and of their tendency to rise within said one zone to direct and to maintain said current of gases in positive avoidance of the tubes of said one bank and along a path adjacent and parallel to said one bank, one of said effects acting upon said gases in direction to move them away from said one bank of tubes and the other of said effects acting to move said gases along said path, transferring heat of said gases substantially solely by radiation to, and at a uniformly high average rate per unit of time per unit of area of, said tubes within said one zone to reduce the temperature of said gases, and transferring heat, at least in part by convection from said current of gases of reduced temperature to the bank of tubes within another of said zones.

6. In an oil cracking system in which heat is applied to the oil by different modes of heat transfer in different zones while flowing in series through banks of oil-conducting heat-absorbing tubes within said zones, the method of heating the oil to cracking temperature which comprises producing in unobstructed radiant view of the tubes of one bank within one of said zones a current of hot combustion gases having substantial initial velocity therein, utilizing the directional effects upon said gases of their initial velocity and of their tendency to rise within one zone to procure passage of said current of gases in positive avoidance of, and along a path adjacent and substantially parallel to, said one bank of tubes within said one zone, passing the oil through said one bank within said one zone from inlet to outlet thereof without intervening passage through any of said other banks of tubes, transferring heat of said gases substantially solely by radiation to said bank of tubes within said one zone, thereafter, and in a second of said zones transferring heat by radiation and convection from said gases to the bank of tubes disposed therein, and in a third of said zones transferring heat by convection from said gases to the bank of tubes disposed therein.

7. In an oil heating system in which heat is applied to the oil by different modes of heat transfer in different zones while flowing through banks of oil-conducting heat-absorbing tubes within said zones, the method of heating the oil to cracking temperature which comprises producing in unobstructed radiant view of the tubes of one of said banks within one of said zones a current of hot combustion gases of substantial initial velocity, said gases having a tendency to rise within said one zone, utilizing the resultant of the directional effects upon said gases of their initial velocity and of their tendency to rise within said one zone to procure passage of said current of gases in positive avoidance of the tubes of said one bank and along a path adjacent and substantially parallel to said bank, one of said effects acting upon said gases in direction to move them away from said one bank of tubes and the other of said effects acting to move said gases along said path, transferring heat of said gases substantially solely by radiation to, and at uniformly high average rate per unit of time per unit of area of, said tubes within said one zone, thereby reducing the temperature of said gases, passing the oil through said one bank from inlet to outlet thereof without intervening passage through the banks within said other zones, in a second of said zones transferring heat by radiation and convection from said gases of reduced temperature to the bank of tubes disposed therein, and in a third of said zones thereafter transferring heat largely by convection from said gases to the bank of tubes disposed therein.

8. A system of heating oil to elevated temperature comprising banks of oil-conducting heat-absorbing tubes disposed within different zones of the system, means for passing the oil through one and then through the remaining of said banks of tubes, means for procuring insubstantial convective heat-transfer from hot combustion gases to the tubes of one of said banks in one of said zones, comprising means including a combustion chamber for producing in said one zone a current of hot combustion gases of substantial initial velocity directed so as to flow along a path adjacent and generally parallel to said one bank of tubes and in unobstructed radiant view therewith, said one bank being so disposed that the effects upon said gases of their initial velocity and of their tendency to rise move said gases in positive avoidance of the tubes of said one bank, said one bank absorbing heat of said gases substantially solely by radiation and reducing the temperature of said gases, and another of said banks of tubes, disposed within another zone of the system, arranged at least in part within said current of gases of reduced temperature absorbing heat therefrom by radiation and convection.

9. In an oil-cracking system, the combination of heat-transfer apparatus comprising banks of heat-absorbing tubes disposed in different zones of the system, means for burning fuel and for producing in open unobstructed radiant view of the tubes of one of said banks a current of hot combustion gases having substantial initial velocity in direction in positive avoidance of said one bank, said one bank being so disposed that the directional effects upon the gases of their initial velocity and of their tendency to rise procure passage of said current of gases along a path adjacent and substantially parallel to and in positive avoidance of the tubes of said one bank, said one bank of tubes absorbing heat substantially solely by radiation and reducing the temperature of said gases, another of said banks of tubes disposed within another zone of the system absorbing heat of said gases of reduced temperature by radiation and convection, and another of said banks of tubes disposed within another of said zones arranged to be swept by said current of gases of reduced temperature and absorbing heat therefrom by convection.

10. In a system of heating hydrocarbon oils to cracking temperature, the combination of a heating chamber, means associated with said chamber for producing a current of hot products of combustion through said chamber of substantial initial velocity therein, a bank of oil-conducting heat-absorbing tubes, in open unobstructed radiant view of said current, disposed directly beneath at least a portion of the path of said current and substantially entirely without all portions of the path of said current of hot products of combustion for absorption of heat substantially solely by radiation and reducing the temperature of said products of combustion, said bank disposed so that the directional effects upon said products of combustion of their initial velocity and of their tendency to rise within said chamber direct said current in positive avoidance of, and along a path adjacent and substantially parallel to, said bank of tubes, a bank of oil-conducting heat-absorbing tubes disposed within said current of hot products of combustion of reduced temperature and receiving heat therefrom by radiation and convection, and means for connecting said banks of tubes for passage of the petroleum first through one and then through the other of said banks.

11. In an oil-cracking system, the combination of fluid heating apparatus comprising a combustion chamber within which combustion of fuel may be partially completed, a heating chamber in communication with the discharge end of said combustion chamber and receiving therefrom a current of hot gases, of substantial initial velocity, extending transversely of said chamber, heat-absorption structure disposed to receive heat by radiation and convection from the gases, means for limiting the temperature to which said structure is subjected comprising heat-absorption structure in said heating chamber exposed to, and disposed adjacent the discharge end of said combustion chamber without, the stream of gases issuing therefrom and absorbing heat preponderantly by radiation, said second-named heat-absorption structure having a position with respect to the discharge end of said combustion chamber such that said gases after substantial decrease of their initial velocity are free to rise within the region of said radiant heat transfer without convectively heating said second-named structure, and means connecting said absorption structures for passage of fluid first through one and then through the other of said structures.

12. In an oil heating system including a heating chamber, the method of heating oil which comprises passing it through a bank of oil-conducting heat-absorbing tubes within said heating chamber and distributed along a wall thereof, passing a current of hot combustion gases through said chamber, initially directing away from said wall, in positive avoidance of the tubes of said bank, and into convective heat-exchange with a second wall of said chamber generally parallel to said first-named wall, a current of hot combustion gases, said current passing in open radiative heat-transfer relation with said tubes, utilizing in the region of said radiant heat-transfer the directional effects upon said gases of their initial velocity and of their tendency to rise to maintain said current in positive avoidance of, adjacent and substantially parallel to, the tubes of said bank and in convective heat-exchange with said second-named wall, transferring heat from said current of gases by convection to said second-named wall and re-radiating same generally transversely of said current and towards said bank of tubes, transferring heat substantially solely by radiation to said tubes from said current of gases and from said second-named wall, thereby reducing the temperature of said current of gases, passing the current of gases of reduced temperature in convective heat-exchange with a second bank of tubes within said chamber, and transferring heat by convection from said current of gases of reduced temperature to said second bank of tubes.

13. In an oil heating system including a heating chamber, the method of heating oil which comprises passing oil through a bank of oil-conducting heat-absorbing tubes disposed along a wall of said heating chamber, initially directing away from said wall, and in positive avoidance of the tubes of said bank, a current of hot combustion gases of substantial initial velocity, said current passing in open radiative heat-transfer relation with said tubes, utilizing in the region of said radiant heat transfer the initial velocity effect of said gases and the forces producing rise of said current to maintain said current away from said wall and in positive avoidance of the tubes of said bank, thereby to procure insubstantial movement of the gases in contact with said tubes, and transferring heat from said current of gases to said tubes substantially solely by radiation.

14. In a furnace for heating hydrocarbon oils to cracking temperature, the combination of a combustion chamber, a heating chamber connected to said combustion chamber, means associated with said combustion chamber for producing a current of hot products of combustion through said heating chamber, conduit elements all of which are disposed directly beneath at least a portion of said current and substantially entirely without all portions of said current of hot products of combustion for absorption of heat directly from said products of combustion substantially solely by radiation and reducing the temperature of said hot products of combustion, said combustion chamber initially directing said current of gases in positive avoidance of said conduit elements, thereby to procure passage of said current of hot gases through said chamber in avoidance of said conduit elements, conduit elements disposed within said current of said products of combustion of reduced temperature and absorbing heat from said products of combustion by convection, and means for connecting said conduit elements for passage of the petroleum therethrough in succession.

15. A system for heating hydrocarbon oils to cracking temperatures comprising wall structure having at least two members forming an elongated gas passage therebetween, a row of conduit elements disposed adjacent each of said members to form along substantially the entire lengths of said members and between said rows an unobstructed gas passage, means for producing a current of hot combustion gases through said passage, and means preventing excessive gas temperatures in said passage comprising a bank of conduit elements whose circumferential areas are entirely free of radiation intercepting refractory exposed to and without the current of said gases for absorption of heat substantially solely by radiation prior to entry of said gases into said passage.

16. An oil heating system comprising a combustion chamber, a heating chamber into the lower portion whereof said combustion chamber discharges hot gases, of substantial initial velocity in said heating chamber, to effect a directed current thereof in said heating chamber, tubular oil-conducting heat-absorbing structure disposed to receive heat from the gases by convection, and means for limiting the temperature to which said tubular structure is heated by said gases comprising tubular oil-conducting heat-absorbing structure disposed adjacent the discharge from said combustion chamber and exposed to and substantially without the current of gases in said heating chamber to absorb heat substantially solely by radiation, said second-named structure having a position with respect to said discharge from said combustion chamber such that said gases after substantial decrease of their initial velocity are free to rise within the region of said radiant heat transfer without convectively heating said second-named tubular structure.

17. A petroleum heating system comprising a chamber, a combustion chamber discharging hot gases into said chamber to effect therein a current of hot gases, tubular petroleum-conducting heat-absorbing structure disposed to receive heat from the gases by convection, tubular petroleum-conducting heat-absorbing structure disposed in said first-named chamber adjacent the discharge from said combustion chamber directly exposed to the hot gases and substantially without said current thereof to absorb heat preponderantly by radiation, said second-named tubular structure having a position with respect to said discharge from said combustion chamber such that said gases after decrease of their initial velocity are free to rise within the region of said radiant heat transfer without convectively heating said second-named structure, and means for serially connecting said absorption structures for passage of the petroleum therethrough.

18. A petroleum heating system comprising a chamber, a combustion chamber discharging hot gases into the lower portion of said chamber to effect therein a rising current of hot gases, tubular petroleum-conducting heat-absorbing structure disposed to receive heat from the gases by convection, bare tubular petroleum-conducting heat-absorbing structure disposed in said first-named chamber adjacent the discharge from said combustion chamber directly exposed to the hot gases and substantially without said current thereof to absorb heat preponderantly by radiation, said second-named tubular structure having a position such that within the region of said radiant heat transfer said rising current of hot gases is in avoidance of said second-named structure, and means for serially connecting said absorption structures for passage of the petroleum therethrough.

19. The method of treating petroleum, which comprises passing it in succession through different heat absorption structures, burning fuel to generate heat, transferring a part of said heat substantially exclusively by radiation to one of said heat absorption structures in one zone, and transferring another part of said heat directly to another heat absorption structure in a second zone largely by radiation from the combustion gases and from a surface within said second zone convectively heated by the combination gases without whose path said second heat absorption structure is substantially disposed.

20. The method of treating petroleum, which comprises passing it in succession through different heat absorption structures, burning fuel to form highly heated gases, passing said gases along a heat absorbing surface in one zone thereby heating heat absorbing structure located outside said zone substantially exclusively by radiation, then changing the direction of said gases, passing them in a second zone along another surface convectively heated thereby, and heating unprotected heat absorption structure within said second zone and disposed substantially without the path of the gases, largely by radiation from said gases and from said last-named surface.

21. Petroleum-heating structure comprising chambers through which hot combustion gases flow in succession, heat absorption structure heated preponderantly by radiation disposed in one of said chambers without the stream of the gases flowing therethrough, means heated by said gases to effect a source of heat radiated directly to said absorption structure, a second heat absorption structure in a second of said chambers exposed to and disposed without the stream of gases through said second chamber and heated preponderantly by radiation, and means for diverting the stream of gases from substantial contact with said second heat absorption structure.

22. Petroleum treating apparatus comprising a combustion chamber, means for effecting combustion within said chamber, a second chamber receiving heat from said combustion chamber substantially exclusively by radiation, tubular heat absorption structure in said second chamber, a third chamber receiving the hot gases from said combustion chamber, a second heat absorption structure in said third chamber exposed to and disposed substantially without the path of the hot gases and receiving heat largely by radiation from a surface convectively heated thereby, and means for passing petroleum first through one and then through the other of said heat absorption structures.

23. The method of transferring heat to petroleum, which comprises burning fuel to generate heat, transferring a part of said heat substantially exclusively by radiation directly to a heat absorption structure in one zone, transferring another part of said heat directly to another heat absorption structure in a second zone largely by radiation from the combustion gases and from a surface within said second zone convectively heated by the combustion gases without whose path said second heat absorption structure is substantially disposed, passing the combustion gases into convective heat-exchanging relation with another heat absorption structure in a third zone, and passing the fluid first through one and then through the remainder of said heat absorption structures.

24. Petroleum-heating structure comprising chambers through which hot gases flow in succession, heat absorption structure heated preponderantly by radiation disposed in one of said chambers without the stream of the gases flowing therethrough, means heated by said gases to effect a source of heat radiated directly to said absorption structure, a second heat absorption structure in a second of said chambers exposed to and disposed without the stream of gases through said second chamber and heated preponderantly by radiation, means for diverting the stream of gases from substantial contact with said second heat absorption structure and a third heat absorption structure heated by convection by said gases after their passage through one of said chambers.

25. The combination with a chamber comprising a wall convectively heated by hot gases passing through the chamber, of heat absorption structure therein exposed to and disposed substantially without the path of said gases and receiving heat from the gases and from said wall predominantly by direct radiation, a second chamber receiving the hot gases from said first chamber, heat absorption structure in said second chamber in part disposed substantially without the path of the gases and in part disposed within the path, said first part of said absorption structure being heated predominantly by direct radiation from said wall and said second part by convection from the hot gases, and means for passing petroleum in succession through said heat absorption structures.

26. The combination with a chamber comprising a wall convectively heated by hot gases passing through the chamber, of heat absorption structure therein disposed substantially without the path of said gases and receiving heat from said wall predominantly by radiation, a second chamber receiving the hot gases from said first chamber and converging in the direction of flow of the gases, heat absorption structure in said second chamber in part disposed substantially without the path of the gases and in part disposed within the path, said first part of said absorption structure being disposed in the region of greater cross-sectional area of said second chamber and heated predominantly by radiation from said wall and said second part being disposed in the region of smaller cross-sectional area of said second chamber and heated by convection from the hot gases, and means for passing petroleum first through one and then through the other of said heat absorption structures.

27. In the art of heating petroleum the method which comprises generating heat by combustion, deriving radiant heat from the resultant hot gases and transferring it to heat absorption structure without the path of said gases, transferring heat of the gases to masses by convection, passing the gases through a zone in which is disposed a second heat absorption structure whose elements are distributed along the path of the gases in said zone, applying heat by radiation from said masses directly to said second heat absorption structure at a rate which diminishes in the direction of flow of gases through said zone, applying heat to a part of said second absorption structure from said gases by convection, and passing petroleum first through one and then through the other of said absorption structures.

28. In the art of heating petroleum the method which comprises generating heat by combustion, deriving radiant heat from the resultant hot gases and transferring it to heat absorption structure without the path of said gases, transferring heat of the gases to masses by convection, passing the gases through a zone in which is disposed a second heat absorption structure whose elements are distributed along the path of the gases in said zone, applying heat by radiation from said masses directly to said second heat absorption structure at a rate which diminishes in the direction of flow of gases through said zone, applying heat to said second absorption structure from said gases by convection at a rate which increases in the direction of flow of said gases through said zone, and passing petroleum first through one and then through the other of said absorption structures.

29. A system for heating hydrocarbon oils to cracking temperatures comprising a heating compartment, means including burner structure for producing along a predetermined path through said compartment a current of hot gases subject to natural and artificially imposed forces acting in different directions, heat absorption structures within said compartment, one of said structures having a plurality of conduit elements disposed in rows spaced one from the other to provide an elongated unobstructed gas passage between said rows, and another of said structures having a plurality of elements whose circumferential areas are entirely free of embrace and unshielded by radiation-intercepting refractory exposed directly to the hot gases, and in relation thereto such that the resultant of said forces causes the current of said gases to avoid contact with said elements, for absorption of heat substantially solely by radiation to absorb sufficient heat to prevent development of excessive temperatures upon, and to moderate the rate of application of heat to, said spaced rows of said elements.

30. In an oil-cracking system, the method of heating oil to a cracking temperature which comprises continuously generating hot combustion gases, subjecting said gases to natural and artificially imposed forces, respectively arising from the tendency of the hot gases to rise and from a substantial initial velocity of said gases, to produce a directed current of said gases, at least one of said forces acting away from and none towards a predetermined zone of the system, and by the resultant of said forces producing a positive velocity of said current of said gases away from said zone to maintain said zone without said current of gases, and in said zone transferring heat to tubular oil-conducting elements substantially solely by radiation from said gases to reduce their temperature, and transferring heat of said gases of reduced temperature by convection to structure within another of said zones traversed by the oil prior to passage through said elements.

31. In an oil heating system including a heating chamber having baffle structure separating it into zones, the method of heating oil to oil-cracking discharge temperature by application of heat substantially solely by radiation and without application in the system of heat to the oil by convection, which comprises passing oil through a bank of oil-containing heat-absorbing tubes disposed within said chamber in spaced relation with said baffle structure, in the lower portion of one of said zones directing in spaced relation with said bank, transversely of one of said zones, and into convective heat-exchanging relation with that portion of the baffle structure opposite said bank of tubes, a current of hot combustion gases of substantial initial velocity, and utilizing the initial velocity effect of said gases and the forces producing rise of said current to maintain a positive velocity of said current away from, in avoidance of, all of the tubes of said bank and to maintain said current in convective transfer with said baffle structure, thereby to procure insubstantial movement of the gases in contact with the tubes of said bank.

32. In an oil heating system including a heating chamber having baffle structure separating it into two zones, the method of heating oil to oil-cracking discharge temperature by application of heat substantially solely by radiation and without application in the system of heat to the oil by convection, which comprises passing oil through a bank of oil-containing heat-absorbing tubes, transferring heat to said tubes substantially exclusively by radiation derived from a current of hot combustion gases, passing the oil through a second bank of oil-containing heat-absorbing tubes disposed in a first of said zones in spaced relation with said baffle structure, directing transversely of said zone, and toward and in convective heat exchange with said baffle structure, said current of hot combustion gases of substantial initial velocity, utilizing the initial velocity effect of said gases and the forces producing rise of said current to procure a positive velocity of said current away from, and in avoidance of, all of the tubes of said second bank and to maintain said current adjacent said baffle structure, thereby to procure insubstantial movement of the gases in contact with the tubes of said second bank, and transferring heat from said baffle structure and from said current of gases to the tubes of said second bank substantially solely by radiation, and from the second of said zones withdrawing said gases passed to said second zone from said first zone without further transfer of heat from said gases to oil-containing heat-absorbing tubes.

33. In a petroleum heating furnace, the method of heating oil which comprises passing petroleum to be heated through heat absorption structure free of and unshielded by radiation intercepting refractory and disposed intermediate opposite walls of the furnace, in one portion of the furnace directing streams of hot combustion gases toward, and individual to, said walls, flowing said streams of gases along said walls and in avoidance of said structure, transferring heat to said walls to produce sources of radiant heat, transferring heat substantially solely by radiation from said opposite walls to said structure, in another portion of the furnace uniting said streams of gases, passing petroleum through heat-absorption structure disposed within said united streams of gases, and transferring by convection heat of said gases to said second-named structure.

34. In an apparatus for heating oil to cracking temperatures, the combination of a heating chamber, means for producing streams of hot combustion gases individual to, and respectively initially directed toward, opposite walls of said chamber, said walls along substantial portions thereof absorbing heat from said gases and re-radiating the absorbed heat, heat absorption structure having a plurality of tubular elements free of embrace and unshielded by radiation intercepting refractory and in their substantial entirety directly exposed to said gases and disposed intermediate said radiant portions of said walls, without the paths of said streams of hot gases, for absorbing heat substantially solely by radiation, any given cross-section of said structure receiving said radiant heat directly from both of said opposite walls, a passage through which the combined streams of gases flow from said chamber, a second heat absorption structure having a plurality of tubular elements within the path of said combined streams of hot combustion gases, and means connecting said structures for passage of oil first through one and then through the other of said structures.

35. In a system of heating oil, the combination of a heating chamber, means for directing streams of hot combustion gases toward and into convective heat exchange with opposite walls of said chamber, said walls absorbing heat from said gases and reradiating the absorbed heat, and a bank of heat-absorbing tubes disposed intermediate said walls, without the paths of said streams of hot gases, any given cross-section of said bank of tubes receiving heat substantially solely by direct radiation from both of said oppositely disposed walls.

36. A system for heating oil comprising wall structure forming a heating chamber, means including a combustion chamber for directing a current of hot combustion gases in convective heat exchange with a portion of said wall structure to elevate it to radiant temperature, means for directing another current of hot combustion gases in convective heat exchange with an opposing portion of said wall structure to elevate it to radiant temperature, tubular heat-absorbing elements intermediate said opposed wall structures and between and without the respective currents of hot gases for absorbing heat substantially solely by radiation from both of said wall structures, a passage within which said currents of gases unite, and a bank of tubes, connected in series with said elements, disposed within said passage and receiving heat from said united currents of gases.

37. A system of heating oil to oil-cracking temperature comprising refractory wall structure forming a heating chamber, means including a combustion chamber disposed in the lower part of said heating chamber for directing separate currents of hot combustion gases towards, and upwardly along, separated portions of said wall structure, a gas passage connected to the upper portion of said chamber, the respective currents of gases passing in convective heat exchange with said separated portions of said wall structure to produce sources of radiant heat, tubular heat-absorbing elements, free of and unshielded by radiation intercepting refractory, between and without the respective currents of hot gases for absorbing heat substantially solely by radiation, and a bank of tubes connected in series with said elements disposed within said passage and receiving heat by convection from the combined currents of said gases.

38. A system of heating oil to oil-cracking temperature comprising a heating chamber having at least a pair of oppositely disposed walls, means for directing into intimate convective heat exchange with said walls currents of hot gases individual thereto, a bank of bare oil-containing heat-absorbing tubes intermediate said opposing walls and disposed intermediate and substantially entirely without said currents of gases for receiving heat from said walls substantially solely by direct radiation, any given cross-section of said bank of tubes receiving radiant heat directly from both of said opposite walls, a passage within which said currents of hot gases unite, and a second bank of oil-containing heat-absorbing tubes disposed within the united currents of said gases and absorbing heat by convection, and means for passing oil first through said second-named bank and then through said first-named bank.

ARTHUR E. NASH.
JAMES S. ALCORN.

CERTIFICATE OF CORRECTION.

Patent No. 2,113,331.                                    April 5, 1938.

ARTHUR E. NASH, ET AL.

It is hereby certified that error appears in the printed specification of the above numbered patent requiring correction as follows: Page 1, first column, line 2, after the word "oil" insert conducting; line 27, strike out "in"; line 51, for "of" first occurrence, read or; page 3, second column, line 69-70, for "exclusive" read exclusively; page 4, second column, line 36, for "structure" read structures; page 5, second column, line 47, for "passage" read flow; page 10, first column, line 46, claim 19, for "combination" read combustion; same page, second column, line 67, claim 25, strike out "in succession" and insert instead the words first through one and then; and same line and claim, before "said" insert the other of; and that the said Letters Patent should be read with these corrections therein that the same may conform to the record of the case in the Patent Office.

Signed and sealed this 24th day of May, A. D. 1938.

(Seal)

Henry Van Arsdale,
Acting Commissioner of Patents.